(12) United States Patent
Liepelt et al.

(10) Patent No.: US 9,573,234 B2
(45) Date of Patent: Feb. 21, 2017

(54) COOLANT DELIVERY SYSTEM AND SKIVING MACHINE EQUIPPED WITH THE SYSTEM

(71) Applicant: GLEASON-PFAUTER MASCHINENFABRIK GMBH, Ludwigsburg (DE)

(72) Inventors: Ralf Liepelt, Hettstedt (DE); Edgar Weppelmann, Asperg (DE)

(73) Assignee: Gleason-Pfauter Maschinenfabrik GmbH, Ludwigsburg (DE)

( * ) Notice: Subject to any disclaimer, the term of this patent is extended or adjusted under 35 U.S.C. 154(b) by 119 days.

(21) Appl. No.: 14/307,887

(22) Filed: Jun. 18, 2014

(65) Prior Publication Data

US 2015/0078851 A1    Mar. 19, 2015

(30) Foreign Application Priority Data

Sep. 13, 2013 (DE) .................... 10 2013 015 252

(51) Int. Cl.
*B23Q 11/10* (2006.01)
*B23C 5/28* (2006.01)
*B23F 5/16* (2006.01)

(52) U.S. Cl.
CPC ............. *B23Q 11/1015* (2013.01); *B23C 5/28* (2013.01); *B23F 5/163* (2013.01); *B23Q 11/1023* (2013.01); *Y10T 407/14* (2015.01); *Y10T 409/105883* (2015.01)

(58) Field of Classification Search
CPC ............ B23Q 11/1023; B23Q 11/1015; B23B 2240/24; B23B 51/06; B23C 5/28; Y10T 408/45; Y10T 408/455; Y10T 407/14; B23F 5/163
See application file for complete search history.

(56) References Cited

U.S. PATENT DOCUMENTS

| 2,080,401 A | 5/1937 | Heard |
| 2,545,195 A * | 3/1951 | Crake .................... E21B 10/04 |
| | | 175/387 |

(Continued)

FOREIGN PATENT DOCUMENTS

| DE | 1117972 B  *  11/1961 | ............. B23B 29/02 |
| DE | 102006042468 A1    4/2008 | |

(Continued)

OTHER PUBLICATIONS

Patent Abstracts of Japan, JP 2004-276136, OSG Corp., 2005, JPO&NCIPI.

(Continued)

*Primary Examiner* — Daniel Howell
*Assistant Examiner* — Ryan Rufo
(74) *Attorney, Agent, or Firm* — Robert L. McDowell

(57) ABSTRACT

A coolant delivery system which serves to deliver a cooling agent whose purpose is to carry away the heat that is generated in the process of machining a toothed profile by means of a skiving wheel rotating about its rotary axis. The coolant delivery system provides for a delivery path section which, seen in a projection onto a plane extending orthogonal to the rotary axis, is arranged closer to the axis than the toothed profile of the skiving wheel and has a dimensional component in the axial direction.

12 Claims, 2 Drawing Sheets

(56) References Cited

U.S. PATENT DOCUMENTS

| | | | |
|---|---|---|---|
| 3,597,817 A * | 8/1971 | Whalley | B23C 5/1054 407/11 |
| 4,168,925 A * | 9/1979 | Dufresne | B23B 29/02 175/213 |
| 4,322,189 A * | 3/1982 | Briese | B23Q 1/0036 407/11 |
| 5,290,135 A | 3/1994 | Ball et al. | |
| 5,667,428 A * | 9/1997 | Lunn | B24B 41/047 407/1 |
| 5,927,911 A * | 7/1999 | Steiner | B23B 51/102 408/159 |
| 2002/0009339 A1* | 1/2002 | Arvidsson | B23C 5/006 407/35 |
| 2007/0104549 A1* | 5/2007 | Hecht | B23D 77/006 408/233 |
| 2007/0127992 A1* | 6/2007 | Spichtinger | B23C 5/006 407/39 |
| 2008/0051013 A1 | 2/2008 | Burgess | |
| 2009/0226268 A1 | 9/2009 | Pilkington | |
| 2011/0217131 A1* | 9/2011 | Bonnarang | B23C 5/28 407/11 |
| 2011/0262237 A1* | 10/2011 | Baratta | B23B 51/0473 408/204 |
| 2012/0230781 A1* | 9/2012 | Hoffer | B23Q 11/1023 407/11 |
| 2012/0275876 A1* | 11/2012 | Lehto | B23C 5/26 409/137 |

FOREIGN PATENT DOCUMENTS

| | | | | |
|---|---|---|---|---|
| DE | 10295201 B4 | 1/2009 | | |
| EP | 0483561 B1 | 2/1999 | | |
| EP | 2517815 A1 | 10/2012 | | |
| EP | 2520396 A1 | 11/2012 | | |
| EP | 2537615 A1 | 12/2012 | | |
| EP | 2639001 A1 | 9/2013 | | |
| JP | S57-21217 A | 2/1982 | | |
| JP | H08-71835 A | 3/1996 | | |
| JP | 2001-138107 A | 5/2001 | | |
| JP | 2004-276136 A | * 10/2004 | | B23C 5/28 |
| JP | 2004-338000 A | * 12/2004 | | B23Q 11/10 |
| JP | 2006-218549 A | * 8/2006 | | B23C 5/28 |
| WO | WO 2010/128930 A1 | * 11/2010 | | B23C 5/28 |

OTHER PUBLICATIONS

Patent Abstracts of Japan, JP 57-021217, Nissan Motor Co. Ltd., 1982, JPO&Japio.

Patent Abstracts of Japan, JP 2001-138107, Komatsu Ltd., 2001, JPO.

International Search Report and Written Opinion for PCT/EP2014/002369, ISA/EPO, Mar. 24, 2015, pp. 14, with English translation.

Search Report for DE 102013015252.6, GPTO, Jul. 29, 2014, pp. 8, with English translation.

\* cited by examiner

COOLANT DELIVERY SYSTEM AND SKIVING MACHINE EQUIPPED WITH THE SYSTEM

This application claims the benefit of German Patent Application No. 102013015252.6 filed Sep. 13, 2013, the disclosure of which is hereby incorporated by reference in its entirety.

The invention concerns a coolant delivery system which serves to deliver a cooling agent whose purpose is to carry away the heat that is generated in the process of machining a toothed profile by means of a skiving wheel rotating about its rotary axis.

Coolant delivery systems of this kind are obviously part of the known state of the art. In the skiving of toothed profiles, also referred to as power skiving, due to the fast rotation of the skiving wheel, very many chips, including smaller ones, are produced in the chip-cutting machining process. The heat which is thereby generated is carried away by a cooling agent, for example a fluid in the form of a cooling oil. Cooling agents suitable for this purpose will be familiar to practitioners who will also be well acquainted with the skiving process itself. A good summary of this process may be found for example in EP 2 537 615 A1.

In state-of-the-art power-skiving machines, for example for the machining of internally toothed profiles, the delivery of cooling agent to the cutting area is routed around the tool. Coolant delivery systems that are suitable for these kinds of machines are normally configured in such a way that a coolant conduit is arranged up to the height of the skiving wheel, so that with one or more free-jet nozzles the cooling oil supplied from the outside can be directed at the cutting area about at the level of the outside diameter of the skiving wheel.

However, it has been found particularly in the machining of internally toothed profiles that these state-of-the-art coolant delivery systems cause recurring problems in their setup and adjustment and that in some cases the coolant conduits suffer damage and require expensive repairs.

It is therefore the object of this invention to propose a coolant delivery system which offers improved reliability or at least simplifies the operation of the overall combination of coolant delivery system and skiving machine.

This task is solved by the invention through a further developed stage of a coolant delivery system of the kind described above in the introductory paragraphs, which is distinguished in essence by having a first delivery path section which, seen in a projection onto a plane extending orthogonal to the rotary axis, is arranged closer to the axis than the toothed profile of the skiving wheel and has a dimensional component in the axial direction.

The invention was significantly motivated by the recognition of the fact that, particularly in the machining of internally toothed profiles, the previously used arrangement for the coolant delivery requires on the one hand an adaptation of the coolant conduits to the specific work piece, to allow the coolant stream to be properly aimed at the work piece, which increases the risk of the coolant conduit colliding with the work piece. On the other hand, it was also recognized that due to the relatively compact spatial arrangement of the skiving machine, the changing of a tool or of the tool holder is made more difficult by the proximity of the coolant conduit. Particularly in the case of a new setup of the coolant delivery after a tool change, the required careful attention of the operator may occasionally be lacking, and the improper setup may lead to a less satisfactory machining process or even to collisions between the cooling oil conduit and the work piece or a clamping device, whereby the conduit can be damaged.

According to the invention, the delivery of the coolant comes in the direction from the tool (skiving wheel). Due to the arrangement of the delivery path section which, seen in a projection onto a plane extending orthogonal to the rotary axis, is arranged closer to the axis than the toothed profile of the skiving wheel, the delivery of the coolant, seen geometrically, occurs from inside the assembly unit of the skiving wheel and its holder rather than from the outside as in the prior art. Accordingly, the arrangement of the coolant conduits on the outside which in a phase of the invention was recognized as creating interference problems is no longer necessary. Thus, even automatic tool changes can be performed more easily if needed. The aforementioned careful attention by the operator is no longer required, and the risk of damage to cooling oil conduits, which can also lead to downtime of the machine tools, is reliably prevented.

While the advantages of the invention are particularly evident in the skiving of internally toothed profiles, the invention is not limited in this regard and is likewise applicable to externally toothed work pieces. Furthermore, the invention does not exclude the use of exterior oil delivery paths. It is possible, for example, to add exterior rinsing oil jets to flush chips from tooth gaps that have already been cut (wherein the rinsing jets can be arranged farther away than cooling jets, as the toothed profile alone presents an easier target to reach with the fluid jet).

In principle, it is entirely conceivable that the first delivery path section is fixed in space, for example in the form of a conduit which runs along a central axis through a tool spindle that is in this case configured as a hollow spindle and through the likewise hollow tool holder passing through a bore hole of the skiving wheel, and that the flow of cooling liquid is subsequently directed at the cutting area by a suitable conduit geometry. However, in a particularly preferred embodiment of the invention the first delivery path section is designed to rotate together with the skiving wheel. This is more compatible with a simple design configuration of the tool spindle and of the clamping device, particularly in view of the high rpm-rates in the skiving process. Furthermore, with the first delivery path section participating in the rotation, the cooling agent is subjected to a centrifugal force which can also be put to good use.

The first delivery path section advantageously passes through the skiving wheel. It is important to note at this point that the first delivery path section can be configured as a single canal, but is not limited to this design configuration. The first delivery path section can also be divided into a plurality of hydrodynamically parallel canals. Accordingly, the skiving wheel can be designed with a central opening or also with one or more eccentrically located openings for the first delivery path section to pass through.

In an advantageous embodiment, the first delivery path section runs at least in part through a skiving wheel holder which supports the skiving wheel. Thus, also in the area of the skiving wheel holder, the first delivery path section, seen in a projection onto a plane extending orthogonal to the rotary axis, lies at least in part closer to the axis than the toothed profile of the skiving wheel. This further reduces the level of operator diligence required, and the tool change can be automated in a particularly simple way.

After the cooling agent has passed through the tool, it could in principle be aimed at the cutting area by means of one or more free-jet nozzles. If the delivery path section participates in the rotation, a suitable nozzle arrangement should optimally spray cooling fluid in all directions, i.e. cover a 360° range.

However, in a particularly preferred embodiment of the invention the direction of the coolant supply stream is also controlled downstream of the first delivery path section. To perform this function, the invention provides for a second delivery path section in the supply stream of cooling agent, wherein the second delivery path section has a dimensional component directed radially from the inside to the outside relative to the axis of rotation. Preferably, the second delivery path section should likewise rotate together with the skiving wheel.

As already mentioned above, in embodiments where the coolant delivery stream participates in the rotation there will be a centrifugal force acting on the cooling agent, which helps to propel the latter radially from the inside to the outside. Consequently, no special means for generating oil pressure is needed at the exit of the cooling oil in the plane of the skiving wheel (i.e. from the first delivery path section). The coolant delivery arrangement in a particularly preferred embodiment is configured in such a way that the cooling oil flows along a cutting face of the skiving wheel to the cutting edge.

It is advantageous if at least a part of the second delivery path section is configured symmetrically relative to a rotation about the rotary axis. This ensures an essentially uniform distribution of the cooling agent over the cutting faces of the skiving wheel, so that a reliable heat-removing effect can be maintained. In a particularly preferred embodiment at least a part of the second delivery path section is delimited by a barrier shield arranged on the cutting-edge side of the skiving wheel. This barrier can be realized for example in the form of a cover, specifically of a rotationally symmetric configuration and preferably with a slightly conical profile. This has the result that the flow velocity of the cooling agent streaming along the inside surface of the barrier will have a vector component in the direction of the rotary axis, i.e. towards the cutting surfaces of the skiving wheel.

The barrier shield can advantageously reach into the area of the teeth of the skiving wheel. If the teeth are step-sharpened, the outside edge of the barrier shield can be seated against the lower edges of the teeth. This leaves substantially triangular openings through which the cooling agent, aided by the centrifugal acceleration, streams in a mainly radial direction along the cutting surfaces of the skiving wheel and ends up in the cutting area. Thus, the cooling agent is led in a targeted manner to the location where it is used.

Dependent on the design configuration, the outside border of the barrier shield can also be spaced apart, in particular by an adjustable amount, from the lower edges of the teeth. However, with the design choice of the border of the barrier shield lying against the skiving wheel, it is possible to generate a contact force through the attachment of the barrier shield, whereby the edges of the skiving wheel are pressed slightly into the cover. This also helps to counteract the tendency of the connection becoming loose, for example when the tool spindle is accelerated or decelerated.

In straight-toothed skiving wheels, i.e. skiving wheels that are not step-sharpened, a suitable design approach has to be found to create the required exit openings between the axial boundaries of the second delivery path section, the barrier shield and the skiving wheel itself. For example, the circumference of the barrier shield could have passage holes in the same number as the teeth of the skiving wheel, or equal to an integer number into which the number of the teeth could be subdivided. Likewise, a continuous gap along the circumference could be realized by setting an appropriate distance between the barrier shield and the surface of the skiving wheel facing the barrier shield. The latter concept could be realized for example with an appropriately dimensioned spacer element, for example a sleeve, in which case the barrier shield could be clamped and positioned between the sleeve and the head of a screw that serves to hold the barrier shield in place.

In an advantageous embodiment, a fastening element of the barrier shield is designed to be adjustable to allow adaptation to a height change of the skiving wheel. The height of the skiving wheel changes for example in resharpening. The adjustment has the purpose that the cross-sectional area of the openings for the radial passage of the cooling agent to the cutting surfaces does not change, regardless of how far the skiving wheel has already been resharpened. This can be realized for example through the seating and attachment of the barrier shield. For example, an attachment screw can be turned in farther, depending on the current height of the skiving wheel. In regard to the concept of using spacers (sleeves) as explained above, it is also possible to use sleeves of different length for different heights of skiving wheels due to resharpening.

In an advantageous embodiment, a fastening means of the barrier shield delimits at least a part of the first delivery path section. Thus, the fastening means is given a dual function. In particular, it can be configured as a hollow bolt whose thread mates with an internal thread of the skiving wheel holder. The cooling agent flows into the hollow bolt and leaves through a plurality of radially directed exit holes which are preferably arranged at equal azimuthal intervals. In this case, the transition from a primarily axial main flow direction to a primarily radial main flow direction can also take place inside the fastening means. In particular with an eccentric arrangement of the internal coolant conduit, the fastening means for the barrier shield can also be of a simpler configuration, for example a solid bolt.

For the connection of the first delivery path section of the coolant delivery system to a coolant reservoir or a coolant circuit, the preferred solution is to use a rotary conduit coupling. Rotary conduit connectors are familiar to those trained in the field of the invention and will not be further described here. Such a rotary coupling could in principle also be realized already at the circumference of the skiving wheel holder. However, for the sake of a simple construction it is preferred if the flow path for the cooling medium runs through a tool spindle which enables the skiving wheel to rotate (and which preferably rotates together with the skiving wheel), and in particular also through a clamping device which serves to secure the skiving wheel or through a skiving wheel holder that carries the skiving wheel. A rotary conduit coupling can in this case also be arranged, relative to the clamping device, at the opposite end of the tool spindle, particularly in a central position. However, it is also possible to design a flow path for the cooling medium through the spindle but outside of the clamping device, for example in the case of eccentrically arranged conduits.

As explained above, in accordance with the invention the skiving wheel with its skiving wheel holder and the integrally incorporated coolant delivery conduit (first and second delivery path section) together form a unit which, in a tool change, can be exchanged as a whole. Accordingly, the invention also covers a tool arrangement for the process of skiving, which includes a skiving wheel designed for the skiving of toothed profiles, a skiving wheel holder which carries the skiving wheel and is designed to be clamped to a clamping device of a skiving machine, as well as a coolant delivery system according to one of the embodiments explained above, insofar as the latter (seen in the opposite direction of the coolant flow path) reaches as far back as the skiving wheel holder.

Such a functional unit can then be coupled by way of sealed plug-in connectors to a skiving machine that is equipped with a compatible coolant conduit, for example through one or more short connector pipes that are inserted into one or more seal-ring-equipped conduit openings in the spindle.

The scope of protection sought for the invention further includes a skiving machine that is equipped with a coolant delivery system according to one of the embodiments described above.

From a method-oriented point of view, the task of the invention is solved by a skiving method for the machining and/or generating of a toothed profile, in particular an internally toothed profile on a work piece, wherein a rotating skiving wheel removes material in the form of chips from the work piece and cooling medium is delivered to carry away the heat that is generated in the process, and wherein the method is distinguished essentially by the fact that the delivery of the cooling medium occurs by way of a delivery path section which, in particular, rotates together with the skiving wheel, and that the delivery occurs from the skiving wheel, in particular in an outward radial direction in the plane of the skiving wheel.

The advantages of the method according to the invention follow from the advantages that were explained above in regard to the coolant delivery system according to the invention. The purpose is in particular to cause the cooling agent to flow along a cutting surface of the skiving wheel to the cutting edges of the latter, i.e. to achieve a guided flow path of the cooling medium all the way to the cutting area.

Further distinguishing features, details and advantages of the invention will become evident from the following description which refers to the attached drawings.

Figure 1:
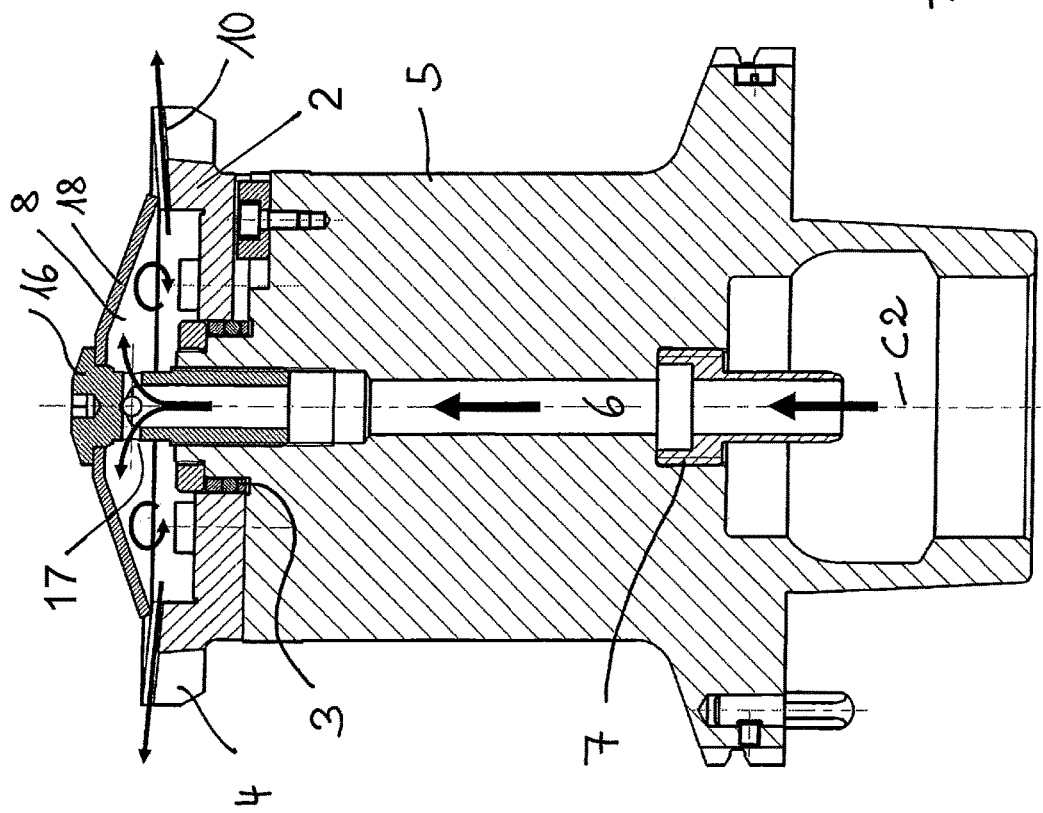
FIG. 1 shows an assembled unit of skiving wheel holder and skiving wheel with an integral coolant delivery arrangement.

FIG. 1 shows an axial section of a skiving wheel holder 5 and, mounted on the latter in a per se conventional manner, a skiving wheel 2 which is designed for the machining and/or generating of toothed profiles on work pieces through the process of skiving. The toothed profile of the skiving wheel 2 in FIG. 1 is identified by the reference symbol 4. The side of the skiving wheel holder 5 that faces away from the skiving wheel is suitably configured for being clamped onto a tool spindle. The connecting structure of the wheel holder in this example consists of a planar contact surface and a conical projection which is designed to be inserted into a conical seat of complementary shape in the tool spindle itself. The conical projection, in turn, has a recess with internal engagement surfaces for clamping braces of a clamping device (see also FIG. 2). However, it is also possible to use other kinds of tool mounts. The illustrated arrangement will be familiar to and is widely used by those trained in this field.

The skiving wheel 2 has a central axial bore hole through which it can be placed on the hub of the skiving wheel holder 5, wherein for the purpose of centering in the mounting process, a ball bushing is set in between. In this example, the skiving wheel 2 is not clamped onto the skiving wheel holder, but attached to the latter by means of screws, which cannot be seen in the sectional view of FIG. 1 (only the heads of the screws are visible, as they are not located in the sectional plane of the drawing).

Integrally incorporated in the illustrated assembly unit of skiving wheel holder 5 and skiving wheel 2 is a coolant delivery system. As a part of the arrangement, the skiving wheel holder 5 has a central bore hole 6 which extends as a continuous passage coaxially with the rotary axis C2 of the skiving wheel and contains an internal screw thread at the end facing towards the skiving wheel. The bore hole 6 together with the axial passage of a hollow bolt 16 that is screwed into the internal thread forms a central conduit for the cooling agent which extends to the far side of the skiving wheel 2 on which the cutting surfaces 10 and the cutting edges of the skiving wheel 2 are arranged.

It is considered obvious that the transport of the cooling agent through the skiving wheel holder 5 and the skiving wheel 2 could also be realized with a different conduit layout, for example with conduits that run eccentrically, conduits that are not parallel to the rotary axis C2, conduits that are divided into branches, or similar arrangements.

After streaming through the skiving wheel holder 5 along the flow direction indicated by the arrows, the cooling agent, for example a cooling oil, leaves the hollow bolt 16 in the radial direction relative to the rotary axis C2 by way of four radial holes 17 (of which only two are actually shown while the others are symbolically indicated in FIG. 1) and arrives in the space located above the side of the skiving wheel 2 that carries the cutting surfaces 10. However, at the exit points the fluid is not yet in a state of motion where the centrifugal force would cause it to flow unimpeded in the outward radial direction. Rather, a cover 18 which is part of the inventive concept is held in place by the hollow bolt 16, with the outside circumference of the cover 18 resting on the edges of the toothed profile 4. In the illustrated example, the teeth are step-sharpened, so that between the outside circumference of the cover 18 and the cutting surface a triangular opening is formed at each tooth, through which the cooling oil exits in the radial direction and ends up streaming along the cutting surfaces 10 to the cutting edges of the skiving wheel 2, as indicated by the radially outward-directed arrows.

The cover 18 basically has the shape of a cone or a surface segment of a sphere, so that the cooling oil which in this case comes out of the four radial holes of the hollow bolt 16 is on the one hand distributed evenly over the entire circumference and in addition conducted directly to the cutting surfaces 10. Also, when setting a resharpened tool back into place, the cover does not interfere with the heads of the attachment screws. In addition, the high rpm-rates of the skiving wheel holder 5 and the skiving wheel 2 in the skiving process may give rise to turbulent flow patterns in the space between the cover 18 and the opposing surface of the skiving wheel, as illustrated by the two swirling arrows, whereby the cooling oil is distributed more evenly in the hollow space. In any event, a constant stream of cooling oil with a sufficient flow velocity is generated along the cutting surfaces 10, as the oil is being delivered at a sufficient rate (oil quantity per unit of time) and is moved by the centrifugal force. Furthermore, making use of the centrifugal force eliminates the need to additionally pressurize the coolant conduit system beyond the pressure required to provide a desired flow rate of the cooling agent.

In the illustrated embodiment, no spacer bushing of the kind described above is needed in order to set a specific distance between the outer diameter of the cover 18 and the tooth edges, as the passage holes which exist as a result of the step-sharpened teeth 4 allow a sufficient supply stream of fluid. However, the aperture can also be created or modified by other means, in particular with a spacer bushing around the hollow bolt 16, which would of course have to leave the radial holes 17 free. In this way, the aperture cross-section of the radial exit openings of the second delivery path section is adjustable. If the teeth are not step-sharpened, there could be holes arranged at the circumference of the cover, or it could have cutouts or slits along its border.

As is already evident from FIG. 1, with the assembled unit of skiving wheel holder 5 and skiving wheel 2 with an integrally incorporated coolant delivery system, any means for delivering cooling agent from the outside can be entirely dispensed with, as it has already been realized as part of the tool. A skiving machine according to the invention, although not illustrated in the attached drawings, is therefore preferably not equipped with an external coolant delivery system, and the design space that would be required for it can be saved. However, the aforementioned additional external conduits which primarily serve a rinsing function can still be present. These conduits can also be arranged at a sufficient distance that they will not interfere with the changing of a tool and will not have to be realigned after a tool change.

Figure 2:
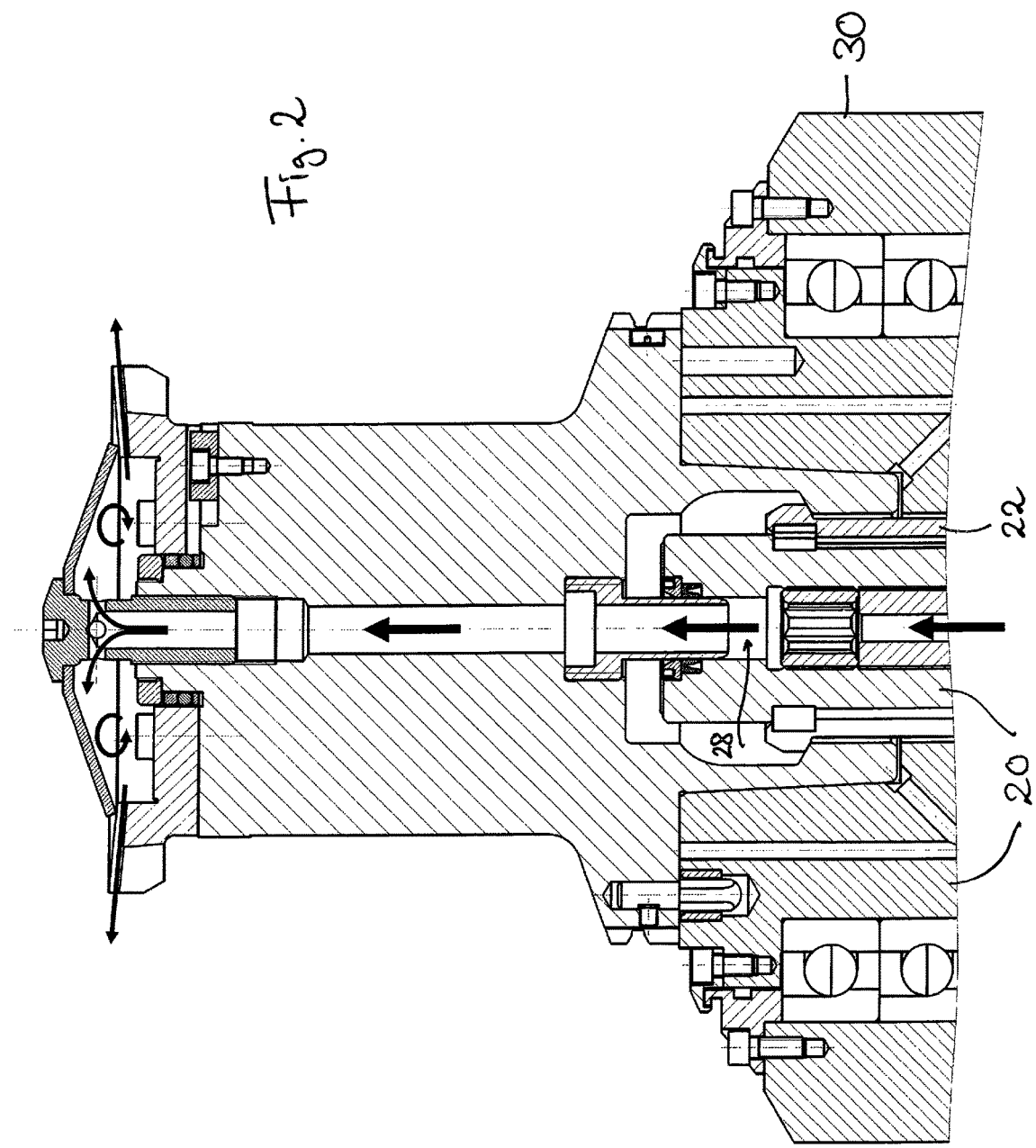
FIG. 2 shows the unit of FIG. 1 clamped to a tool spindle.

FIG. 2 shows how the skiving wheel holder 5 is mounted on a tool spindle 20. The tool spindle 20 is held in rotary bearings in a rotationally fixed part 30, for example a section of a machine bed, and can be driven in the normal way, for example directly by a motor (not shown). The skiving wheel holder is secured by clamping means arranged in a central bore hole of the tool spindle 20. Of the clamping means, only the distal ends of a clamp chuck 22 are visible in FIG. 2. However, the invention is not limited to any specific clamping arrangement. The only important aspect is that the coolant supply system needs to have a compatible connector to the cooling fluid conduit in the skiving wheel holder 5. In the illustrated example, the skiving wheel holder includes an entrance orifice in the form of a tubular connector 7 which in the process of mounting the skiving wheel holder automatically enters into a central bore hole 28 of the tool spindle 20. A seal ring prevents leakage of the cooling agent in this area. At the opposite axial end of the spindle in this example, there is an interface to the non-rotating part of the coolant conduit of the cooling circuit by way of a rotary conduit coupling (not shown). However, the latter could also be arranged at another location.

The invention can be realized without limitation to the specific embodiment shown here. Rather, the features presented in the following claims and in the foregoing description, taken individually and in any combination, can be essential in realizing the invention in its different embodiments.

The invention claimed is:

1. Coolant delivery system for the delivery of a cooling agent that serves to carry away the heat generated in the skiving of a toothed profile by means of a skiving wheel (2) rotating about its rotary axis (C2), said skiving wheel including tooth profiles (4) and having a far side defined by cutting surfaces (10) with respective cutting edges, characterized by a first delivery path section which, with respect to a projection of said first delivery path section onto a plane extending orthogonal to the rotary axis, is arranged closer to the rotary axis than the toothed profile (4) of the skiving wheel and has a first coolant delivery path component in the axial direction of said rotary axis, said first coolant delivery path component extending in the axial direction to radially directed outlets, said outlets being located axially beyond said far side of said skiving wheel, said coolant delivery system comprising a second delivery path section having a second coolant delivery path component extending in an outward radial direction relative to said rotary axis, said first coolant delivery path component being in fluid communication with said second coolant delivery path component via said radially directed outlets, wherein at least a part of the second delivery path section is delimited by a barrier shield arranged axially beyond said far side of said skiving wheel, said barrier shield having a shape of one of a cone or a surface segment of a sphere whereby cooling agent will flow along an inside surface of said barrier shield and be directed toward said cutting surfaces.

2. Coolant delivery system according to claim 1, wherein the first delivery path section (6) rotates together with the skiving wheel.

3. Coolant delivery system according to claim 1 wherein the first delivery path section passes through one or more openings of the skiving wheel.

4. Coolant delivery system according to claim 1 wherein the first delivery path section passes at least in part through a skiving wheel holder (5) carrying the skiving wheel.

5. Coolant delivery system according to claim 1 wherein the cooling medium streams along a cutting surface (10) of the skiving wheel to the cutting edges of the latter.

6. Coolant delivery system according to claim 1, wherein the barrier shield extends radially all the way out into the area of the teeth (4) of the skiving wheel, wherein the teeth are step-sharpened.

7. Coolant delivery system according to claim 1 wherein a fastening element (16) of the barrier shield is adjustable to allow adaptation to a height change of the skiving wheel.

8. Coolant delivery system according to claim 1 wherein a fastening element for the barrier shield delimits at least a part of the first delivery path section (6) and is configured as a hollow bolt (16).

9. Coolant delivery system according to claim 1 wherein the first delivery path further passes through a tool spindle (20) which allows the skiving wheel to rotate and is equipped for this purpose with a rotary conduit coupling.

10. Coolant delivery system according to claim 1 wherein the first delivery path further passes through a clamping device which secures the skiving wheel and a skiving wheel holder carrying the skiving wheel.

11. Arrangement for the process of skiving, comprising a skiving wheel (2) designed for the skiving of toothed profiles, a skiving wheel holder (5) which carries the skiving wheel and is designed to be clamped to a tool spindle of a skiving machine, as well as a coolant delivery system (6, 8) according to claim 1.

12. Skiving machine with a coolant delivery system (6, 8) according to claim 1.

* * * * *